(12) United States Patent  
Takahashi

(10) Patent No.: US 7,805,468 B2  
(45) Date of Patent: Sep. 28, 2010

(54) INFORMATION PROCESSING APPARATUS, SERVER APPARATUS FILE PROCESSING METHOD, STORAGE MEDIUM, AND PROGRAM

(75) Inventor: Takeshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 11/562,329

(22) Filed: Nov. 21, 2006

(65) Prior Publication Data

US 2007/0130166 A1  Jun. 7, 2007

(30) Foreign Application Priority Data

Dec. 1, 2005  (JP)  ............................. 2005-347866

(51) Int. Cl.  
*G06F 17/30* (2006.01)
(52) U.S. Cl. .................................................... 707/821
(58) Field of Classification Search ........................ None  
See application file for complete search history.

(56) References Cited

U.S. PATENT DOCUMENTS 5,806,072 A * 9/1998 Kuba et al. ................. 707/200

2003/0105830 A1 * 6/2003 Pham et al. ................. 709/216  
2005/0210291 A1 * 9/2005 Miyawaki et al. ........... 713/201

FOREIGN PATENT DOCUMENTS

JP   11-053243 A    2/1999

OTHER PUBLICATIONS

Gruenbacher et al., "Preserving ACLs and EAs in Editors and File Managers", Oct. 11, 2004. http://web.archive.org/web/20041011190750/http://www.suse.de/~agruen/ea-acl-copy/.*

* cited by examiner

*Primary Examiner*—Mohammad Ali  
*Assistant Examiner*—Syed H Hasan  
(74) *Attorney, Agent, or Firm*—Canon U.S.A., Inc. I.P. Division

(57) ABSTRACT

In a system that includes a client for managing a file and a document management server for storing the file on a storing portion, the client requests to a policy management server to issue policy data to be set to the storing portion. Then, the client creates a control file to be set to the storing portion, based on the policy data acquired from the policy management server and transfers the created control file to the document management server.

11 Claims, 13 Drawing Sheets

| PID | POLICY NAME |
|---|---|
| 1 | POLICY 1 |
| 2 | POLICY 2 |
| 3 | POLICY 3 |

*3002*

| DOCUMENT ID | PID | KEY |
|---|---|---|
| 1 | 1 | ****** |
| 2 | 1 | ****** |
| 3 | 2 | ****** |
| 4 | 1 | ****** |
| 5 | 2 | ****** |

*3003*

| UID | USER NAME | PASSWORD |
|---|---|---|
| 1 | USER 1 | *** |
| 2 | USER 2 | *** |
| 3 | USER 3 | *** |

*3004*

| PID | UID | RIGHTS |
|---|---|---|
| 1 | 1 | WRITE |
| 1 | 2 | READ |
| 2 | 1 | WRITE |
| 2 | 2 | WRITE |
| 3 | 1 | WRITE |

FIG.12

STORAGE MEDIUM SUCH
AS FD/CD-ROM

| DIRECTORY INFORMATION |
|---|
| FIRST DATA PROCESSING PROGRAM<br>PROGRAM CODES CORRESPONDING TO STEPS OF FLOW CHART OF FIG.6 |
| SECOND DATA PROCESSING PROGRAM<br>PROGRAM CODES CORRESPONDING TO STEPS OF FLOW CHART OF FIG.7 |
| |

MEMORY MAP OF STORAGE MEDIUM

FIG.13

STORAGE MEDIUM SUCH
AS FD/CD-ROM

| DIRECTORY INFORMATION |
|---|
| FIRST DATA PROCESSING PROGRAM<br>PROGRAM CODES CORRESPONDING TO STEPS OF FLOW CHART OF FIG.11 |
| |

MEMORY MAP OF STORAGE MEDIUM

INFORMATION PROCESSING APPARATUS, SERVER APPARATUS FILE PROCESSING METHOD, STORAGE MEDIUM, AND PROGRAM

BACKGROUND OF THE INVENTION

1. Field of the Invention

The present invention relates to an information processing apparatus for processing a file by storing the file on a server apparatus having a plurality of storing portions (e.g. folders or directories).

2. Description of the Related Art

Recently in office environments, document management systems have been assembled with a document reading device, a document management server, and a client such as personal computer (PC) which are placed on the same network.

Moreover, there are many document management systems that share a document among a plurality of users, which offer a method for providing access rights of the document only to specific users by setting up the access rights to the document or a folder. Further, systems have been proposed in an environment having a document management server and a document management database (DB) which are individually managed.

More specifically, a system uses a server list database that stores a list of document management servers, a user management file that manages information related to each user and group, and an access right database (DB) that stores access right information of the users and groups. For example, Japanese Patent Application Laid-Open No. 11-53243 discusses a method for collectively performing the user management among a plurality of document management system servers. Thus, there are many such document management systems that manage access rights and users in database (DB) units.

However, in the system that manages access rights and users in database (DB) units, if a document management container such as folder is copied between data bases (DB), a setup condition of the access right becomes nil and free at a copy destination.

Further, it is operationally difficult to setup the access rights at the copy destination manually to the same level as a copy source because the access rights and user management scheme in each database (DB) is typically assumed to be different.

Similar problems occur in operating storages having different access right schemes when a portal application is used that can read and operate the storages of the different types of document management systems.

Therefore, it would be desirable to provide an information processing apparatus for creating a control file based on policy data acquired from a policy server apparatus, and setting up the control file to each of the storing portions (e.g. folders or directories) managed by a server apparatus.

SUMMARY OF THE INVENTION

The present invention is directed to an information processing apparatus for creating a control file based on policy data acquired from a policy server apparatus, and setting up the control file to each storing portions (e.g. folders or directories) managed by a server apparatus.

According to an aspect of the present invention, an information processing apparatus is provided configured to communicate with a first server apparatus configured to store and manage a file using a storing portion, and with a second server apparatus configured to issue policy data for controlling access rights to the storing portion. The information processing apparatus includes a requesting unit configured to request the second server apparatus to issue policy data to be set to the storing portion; a creating unit configured to create a control file to be set to the storing portion based on the policy data acquired from the second server apparatus; and a transferring unit configured to transfer to the first server apparatus the created control file.

According to another aspect of the present invention, the information processing apparatus may further include a first acquiring unit configured to acquire the created control file set to the storing portion; a second acquiring unit configured to identify the policy data from the acquired control file, and to acquire from the second server apparatus a list of allowed operations which can be performed to the storing portion; and a control unit configured to control access rights to the storing portion based on the acquired list of allowed operations.

According to yet another aspect of the present invention, a server apparatus is provided which is configured to communicate with an information processing apparatus. The server apparatus includes a file processing unit configured to use a storing portion of a first storage to store a file acquired from the information processing apparatus; an acquiring unit configured to acquire a control file created by the information processing apparatus for controlling access rights of the storing portion; a setting unit configured to set the control file to the storing portion; and a copying unit configured to copy to a second storage the storing portion to which the control file is set based on a request to copy the storing portion from the information process apparatus.

Moreover, according to another aspect of the present invention, a first server apparatus is provided which is configured to store and manage a file using a storing portion, and further configured to communicate with a second server apparatus configured to create a control file for controlling access rights to the storing portion, wherein the communication between the first and second server apparatuses is based on a request from an information processing apparatus. Here, the first server apparatus includes a setting unit configured to acquire the control file created at the second server apparatus, and to set the control file to the storing portion.

Still further, according to another aspect of the present invention, a file processing method is provided for an information processing apparatus configured to communicate with a first server apparatus configured to store and manage a file using a storing portion, and further configured to communicate with a second server apparatus configured to issue policy data for controlling access rights to the storing portion. The method includes requesting the second server apparatus to issue the policy data to be set to the storing portion; creating a control file to be set to the storing portion based on the policy data acquired from the second server apparatus; and transferring to the first server apparatus the created control file.

Additionally, according to yet another aspect of the present invention, the file processing method may further include acquiring the control file set to the storing portion; identifying the policy data of the control file acquired from the first acquiring unit, and acquiring from the second server apparatus a list of allowed operations which can be performed to the storing portion; and controlling access rights to the storing portion based on the acquired list of allowed operations.

Also, according to another aspect of the present invention, a file processing method is provided for a server apparatus configured to communicate with an information processing apparatus. Here, the method includes storing a file acquired from the information processing apparatus using a storing portion from a first storage; acquiring a control file created by the information processing apparatus for controlling access rights to the storing portion; setting the acquired control file to the storing portion; and copying to a second storage the storing portion to which the control file is set based on a request to copy from the information processing apparatus.

According to yet another aspect of the present invention, a file processing method is provided for a first server apparatus configured to communicate with a second server apparatus configured to create a control file for controlling access rights to a storing portion managed by the first server apparatus, wherein the communication between the first and second server apparatuses is based on a request from an information processing apparatus, wherein the first server includes a setting unit. Here, the method includes acquiring the control file created by the second server apparatus; and setting the created control file to the storage portion.

And further, according to another aspect of the present invention, a computer readable medium readable is provided containing computer-executable instructions for controlling an information processing apparatus configured to communicate with a first server apparatus configured to store and manage a file using a storing portion, and with a second server apparatus configured to issue policy data that control access rights to the storing portion. The computer readable medium includes computer-executable instructions for requesting the second server apparatus to issue the policy data to be set to the storing portion; computer-executable instructions for creating a control file to be set to the storing portion based on the policy data acquired from the second server apparatus; and computer-executable instructions for transferring to the first server apparatus the created control file.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of the data configuration of information relating to policy registered to a policy management database of FIG. 1 according to an aspect of the present invention.

FIG. 12 illustrates an exemplary memory map of a storage medium storing various data processing programs readable by an information processing apparatus in accordance with the embodiments of the present invention.

FIG. 13 illustrates an exemplary memory map of a storage medium storing various data processing programs readable by a server apparatus in accordance with the embodiments of the present invention.

DETAILED DESCRIPTION OF THE EMBODIMENTS

Various exemplary embodiments, features, and aspects of the invention will be described in detail below with reference to the drawings.

First Exemplary Embodiment

[Description of Exemplary System Configuration]

Figure 1:
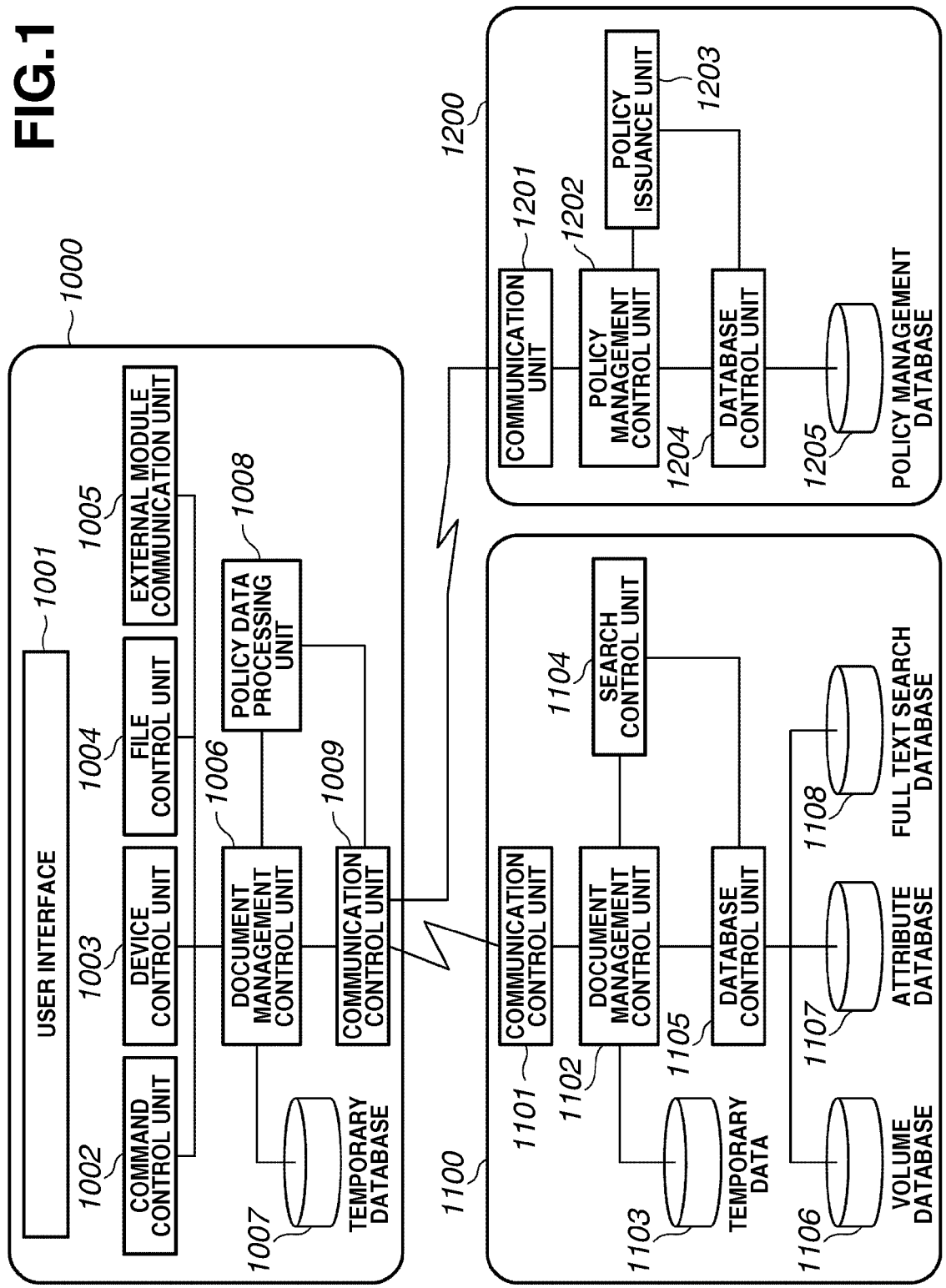
FIG. 1 illustrates an example of a document management system applicable to a server apparatus and an information processing apparatus in accordance with a first exemplary embodiment of the present invention.

FIG. 1 illustrates an exemplary module configuration of a document management system applicable to a server apparatus and an information processing apparatus, in accordance with the first exemplary embodiment of the present invention. The document management system executes various modules stored in a client 1000, a document management server 1100, and a policy management server 1200, to cooperatively perform document management processes.

In the document management system, the client 1000 operates on an operating system (OS) of the personal computer (PC), and is configured over a network to allow communication with the document management server 1100 and the policy management server 1200 in which their predetermined operating systems (OS) are installed.

The client 1000 imports a document from a device such as scanner (not shown) or a file on the operating system (OS), registers the document information in a storage apparatus provided in the document management server 1100, and manages an access status of each authorized user to this document information.

In the present embodiment, the policy management server 1200, apart from the document management server 1100, executes access control to a transmitted file based on control data named as policy.

<Exemplary Document Input/Output Processing Unit>

First, processing units that input and output a document will be described. In the client 1000, a user interface 1001 controls and displays an operation setup screen on a display apparatus (not shown). A user performs, via the user interface 1001, operation such as registering a document to the document management server 1100, acquiring a document from the document management server 1100, or searching a document, by operating and instructing to the operation setup screen displayed on the display apparatus. Moreover, the user performs, via the user interface 1001, operations such as setting up of an access right to a fixed keyword according to the present invention, and acquiring and displaying a document to which the access right is set.

Information operated in the user interface 1001 is analyzed at a command control unit 1002 to execute appropriate processing. Moreover, commands required in communicating with the policy management server 1200 and the document management server 1100 are generated here if necessary.

A device control unit 1003 controls a device such as a scanner. The device control unit 1003 is configured to retrieve document data from a device side or receives data transmitted from the device side. A file control unit 1004 is configured to enable input of a document file stored in an operating system (OS) of a file server by importing the document data. The file control unit 1004 also exports a file managed in the document management server 1100 to the operating system (OS) of a client terminal.

An external module communication unit 1005 communicates with an external application by handing over document information inside the file management server 1100, to the external application, and receiving the document information from the external application.

For example, the external module communication unit 1005 executes a process of handing over documents being managed at the document management server 1100 to a mailer corresponding to MAPI (messaging application program interface). In the present embodiment, MAPI is a standard specification used for an electronic mail function on Windows (trademark) and is a part of the same company's WOSA (Windows (trademark) open service architecture) concept. WOSA is a specification that enables the user to utilize transmission and reception functions of the electronic mail from various software applications.

<Exemplary Client System Internal Processing Unit>

Next, various processing units arranged inside a client system will be described. A document management control unit 1006 is a core unit of the client 1000. The document management control unit 1006 processes data according to files and commands handed over from the document input/output processing unit. A temporary database 1007 stores temporary data. The temporary database 1007 temporarily stores the data generated during image processing, the data generated during communication with servers, and so forth. More specifically, the data is secured at a storage apparatus such as hard disk provided in the client 1000, and access to the data is managed by the operating system (OS).

A policy data processing unit 1008 controls access to a folder, by utilizing a control file associated with the document management container such as a folder and a directory. A policy data is attached to this control file. The policy data is issued by the policy management server 1200, and acquired from the policy management server 1200 for its management.

The policy data processing unit 1008 transmits to the policy management server 1200 the policy data attached to the control file, in order to confirm the policy data. Moreover, the policy data processing unit 1008 processes a list of allowed operations acquired from the policy management server 1200 based on the transmitted policy data, and returns a result confirming the policy (the allowed operations) to the document management control unit 1006.

A communication control unit 1009 controls communication between the document management server 1100 and the policy management server 1200 using a predetermined protocol. The communication control unit 1009 of the present embodiment is configured for control processes of the document management server 1100 and the policy management server 1200, and the protocol prepared by the operating system (OS), such as TCP/IP, is used for controlling the communication itself.

<Exemplary Inner Processing Unit in Document Server System>

Next, various processing units arranged inside a document server system will be described. Referring to the document management server 1100, a communication control unit 1101 controls communication with the communication control unit 1009 of the client 1000. The communication control unit 1101 of the document management server 1100 can simultaneously communicate with communication control units 1009 of a plurality of clients.

A document management processing unit 1102 controls a process on the document management server 1100 side responding to instructions from the client 1000. An inner data storing portion 1103 stores temporary data. This storage section temporarily stores the data created during communication with the client 1000, the document converted according to a document conversion rule, and so forth. More specifically, a storage apparatus such as a hard disk provided in the document management server 1100 is secured as the storage section. And a search control unit 1104 performs a search process requested by the client 1000, and a process of creating a search index of the registered document.

<Exemplary Database Processing Unit>

Next, the data processing unit will be described. A database control unit 1105 creates data which are stored in a volume database 1106, an attribute database 1107, and a full text search database 1108. The database control unit 1105 stores documents corresponding to the volume database 1106, the attribute database 1107, and the full text search database 1108.

Moreover, the database control unit 1105 extracts data from the respective databases depending on requests from the client 1000, and creates and hands over document information to the client 1000.

The volume database 1106 stores an actual document information. The volume database 1106 is a conceptual one, and there is no problem if actually, it is a file system of the operating system (OS).

The attribute database 1107 stores information related to attributes such as names, dates, and comments of the document information. Moreover, the attribute database 1107 stores management information data such as information about users who use the document management system of the present invention, an access control table of keywords, and a document conversion rule according to the access right.

The full text search database 1108 extracts text data from the registered document information, and registers indexed data. When a full text search is executed at the client 1000, the full text search database 1108 is searched.

<Exemplary Inner Processing Unit in Policy Management Server System>

Next, various processing units arranged inside a an exemplary policy management server system will be described. Referring to the policy management server 1200 from FIG. 1, a communication control unit 1201 controls communication with the communication control unit 1009 of the client 1000. The communication control unit 1201 of the policy management server 1200 is configured to allow simultaneous communication with the communication control units 1009 of the plurality of clients 1000.

A policy management control unit 1202 controls processes at the policy management server 1200 side according to a request from the client 1000. A policy issuance unit 1203 creates the policy data in accordance with the request from the client 1000 received at the policy management control unit 1202. Concurrently, the policy issuance unit 1203 requests to a database control unit 1204 to register the policy data in a policy management database (PMDS) 1205.

<Exemplary Database Processing Unit>

Next, exemplary database processing units will be described. The database control unit 1204 stores the policy data issued by the policy issuance unit 1203 in the policy management database (PMDS) 1205. Moreover, it extracts the policy data from the policy management database (PMDS) 1205 according to the request from the client 1000, and creates and hands over a document to the client 1000. The policy management database (PMDS) 1205 stores data required for policy management.

In the present embodiment, the data required for policy management includes policy identification data and policy attribute data of the policy itself. Furthermore, the data required for policy management includes document identification data to be controlled in association with the policy, and user identification data and authentication data that regulate operation of the policy.

Figure 2:
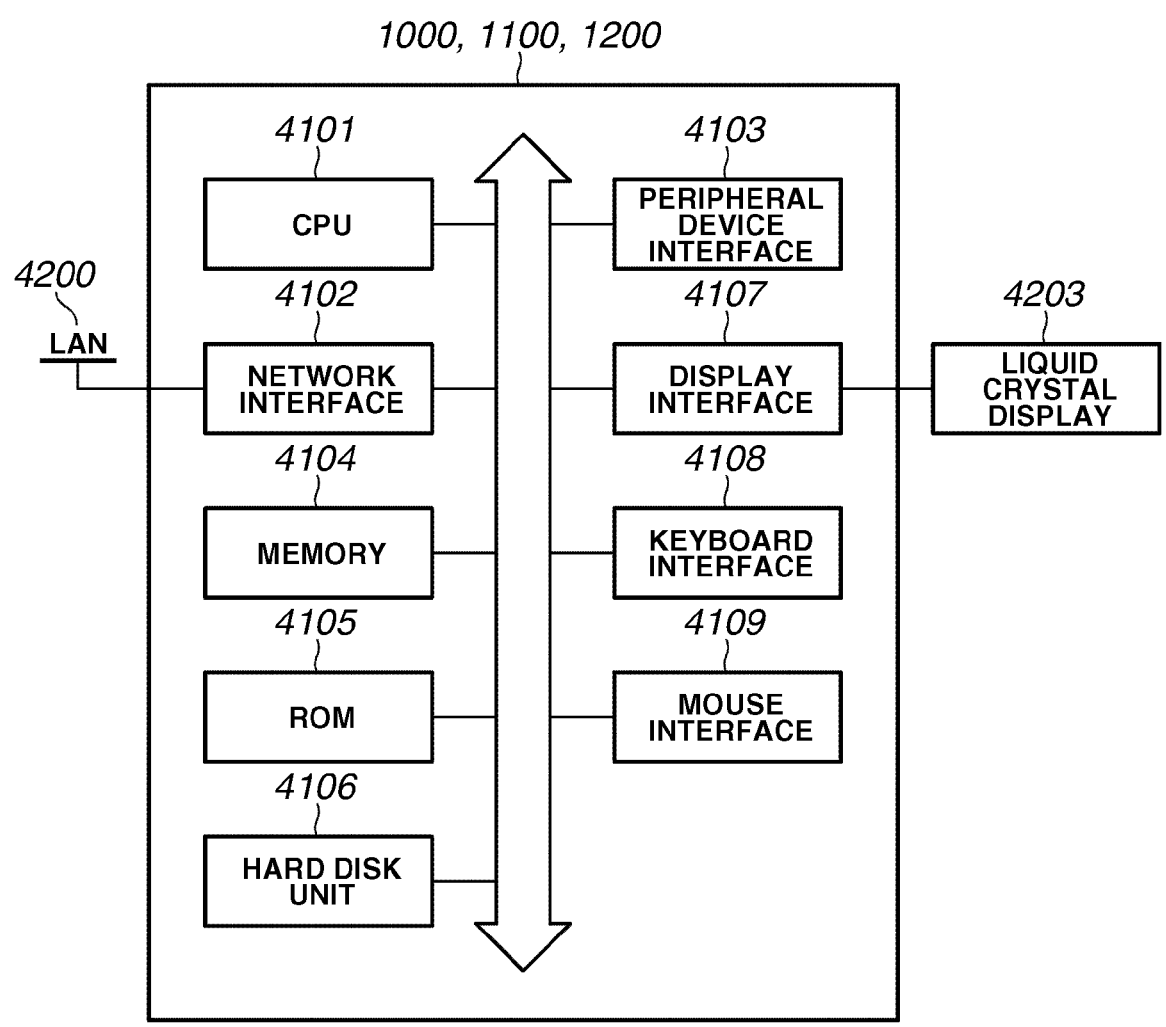
FIG. 2 illustrates a block chart that describes an exemplary hardware configuration of a client, a document management server, and a policy management server of FIG. 1 according to an aspect of the present invention.

FIG. 2 is a block chart that describes an exemplary hardware configuration of the client 1000, the document management server 1100, and the policy management server 1200, shown in FIG. 1. Since the client 1000, the document management server 1100, and the policy management server 1200 provide similar hardware resources, FIG. 2 is described as an example configuration of a hardware resource.

Referring to FIG. 2, a central processing unit (CPU) 4101 controls whole of the client or the servers by executing control program stored on a memory 4104. The central processing unit (CPU) 4101 executes program stored on a read-only memory (ROM) 4105 and a hard disk unit 4106 by loading them onto the memory 4104. A network interface 4102 performs data communication with other devices via a network.

Software executed by the central processing unit (CPU) 4101 can exchange data in bi-directions with a multi-function peripheral (MFP) device, a scanner apparatus, a printer apparatus, or other network devices, and with other computers, via a LAN 4200.

A peripheral device interface 4103 controls peripheral devices. The memory 4104 is typically a volatile memory unit for storing data and commands executed at the central processing unit (CPU) 4101.

The read-only memory (ROM) 4105 stores data and programs for performing the basic hardware control. The hard disk unit (hard disk) 4106 is typically a non-volatile memory unit for storing data calculated and programs executed at the main body of the personal computer (PC). A hard disk unit 4106 provided in the client 1000 installs an operating system (OS) for the client so that it can function as the client. Moreover, a hard disk unit 4106 provided in the document management server 1100 has an operating system (OS) for a client installed so that it can function as the client.

Further, a hard disk unit 4106 provided in the policy management server 1200 has an operating system (OS) for a client installed so that it can function as the policy management server 1200. The hard disk unit 4106 is configured to allow storing of a boot program, a plurality of applications, an edit file, an user file, a network management program, and a module shown in FIG. 1. The boot program is an initialization program (a program that starts execution (operation) of hardware and software).

The central processing unit (CPU) 4101 loads an operating system (OS) onto the memory 4104 where various applications and modules are executed under the management of the operating system (OS). The central processing unit (CPU) 4101 is configured to execute control procedures which will be described in the later flowcharts.

Further, the hard disk unit 4106 provided in the document management server 1100 reserves a space for the volume database 1106, the attribute database 1107, and the full text search database 1108. Moreover, the hard disk unit 4106 provided in the policy management server 1200 reserves a space for the policy management database (PMDS) 1205.

A display interface 4107 connects a liquid crystal display 4203 to display inner conditions and execution modes of the client 1000. Software executed by the central processing unit (CPU) 4101 can render a graphical user interface on the liquid crystal display 4203. The liquid crystal display 4203 is driven by the display interface 4107.

A keyboard interface 4108 and a mouse interface 4109 connects inputting apparatuses for a user to input data and commands. The peripheral device interface 4103 connects the peripheral devices that operate with the specification such as USB, RS-121C serial, and IEEE 1394. The user interface 1001 controls the display interface 4107 so that the liquid crystal display 4203 is displayed.

Accordingly, in the aforementioned file management system, the client 1000 creates a control file to be set to a folder managed by the document management server 1100 as follows.

Referring back to FIG. 1, the client 1000 can communicate with the document management server 1100 that stores and manages files by managing a plurality of storing portions (e.g. folders or directories). The client 1000 can also communicate with the policy management server 1200 that can issue policy data which controls access rights to the folders.

The client 1000 requests to the policy management server 1200 to issue policy data to be set to a folder. Then, based on the policy data acquired from the policy management server 1200, the policy data processing unit 1008 creates a control file to be set to a folder secured in a storage unit of the document management server 1100. The client 1000 transfers the control file created by the policy data processing unit 1008 to the document management server 1100.

In a case that the client 1000 has received a request for a file stored in any folders of the document management server 1100, the client 1000 acquires the control file set in the folder. Then, the policy data processing unit 1008 identifies the policy data in the control file which is acquired from the document management server 1100, and acquires a list of allowed operations which can be performed to the folder, from the policy management server 1200. Then, based on the list of operations acquired from the policy management server 1200, the document management control unit 1006 controls the access right to the folder in accordance with the control procedure shown in FIG. 7.

Figure 3:
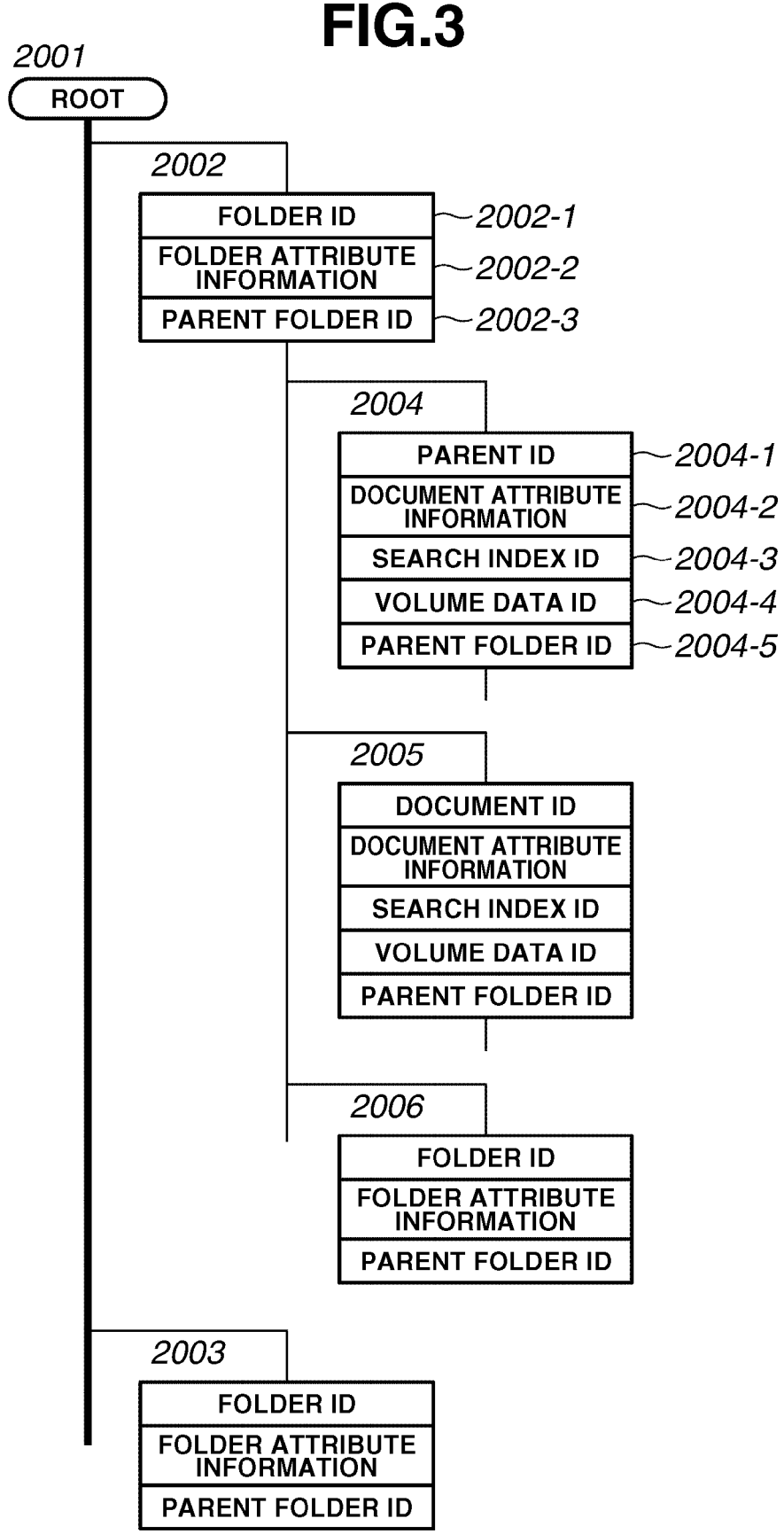
FIG. 3 illustrates a conceptual drawing showing an exemplary data configuration of information relating to documents registered to an attribute database of FIG. 1 according to an aspect of the present invention.

FIG. 3 illustrates a drawing which shows exemplary data configuration of information related to the document registered in the attribute database 1107 of FIG. 2. Referring to FIG. 3, a root 2001 of the attribute database 1107 manages all the registered data in the attribute database 1107 as child data.

Folder data 2002 is data corresponding to a folder (storing portion) in which document data is stored by the user of the client 1000. The folder data 2002 includes a folder ID 2002-1, a folder attribute information 2002-2, and a parent folder ID 2002-3. Because there can be a plurality of folders, a folder placed at the highest position registers the plurality of folders as child data immediately below the root 2001, to be registered in the same manner as folder data 2003. A parent folder of the folder situated at the highest position is the root 2001.

Document data 2004 are the child data stored in the folder. The document data 2004 include a document ID 2004-1, a document attribute information 2004-2, a search index ID 2004-3, a volume data ID 2004-4, and a parent folder ID 2004-5. Moreover, the document data 2004 store document name, updated date, and comment data in the document attribute information 2004-2.

The search index ID 2004-3 is identification (ID) used to distinguish a document by the full text search database 1108. If keyword search is instructed to a search engine, a corresponding search identification (ID) is returned. The volume data ID 2004-4 is identification (ID) registered to the volume database 1106. The identification (ID) can be used to extract information related to the document from each database.

There can be a plurality of document data under a folder. The document data can be registered by that number as registered in the case of the document data 2005.

A control file of the present embodiment is also managed and stored in a similar format as the document data 2004 or the document data 2005. However, a control file attribute is set as a document attribute of the control file, therefore, the control file is not displayed when an inside of a folder is viewed through the user interface 1001.

The folders can be hierarchically structured by forming other folders below a folder. In this case, the data are registered as shown in folder data 2006.

FIG. 4 illustrates an example of the data configuration of information related to the policy registered in the policy management database (PMDS) 1205 of FIG. 1. Referring to FIG. 4, a table 3001 associates policy names with policy identification (PID). A table 3002 manages a relation of a document attached policy, an identification of the policy attached (PID), and a decryption key of the document contents encrypted during policy attachment.

A user information table 3003 includes user identification, user names, and passwords managed by the policy management server 1200. A rights management table 3004 manages definition of each policy, and manages user identification (UID) and rights (e.g. allowed operation) permitted to the users.

Figure 5:
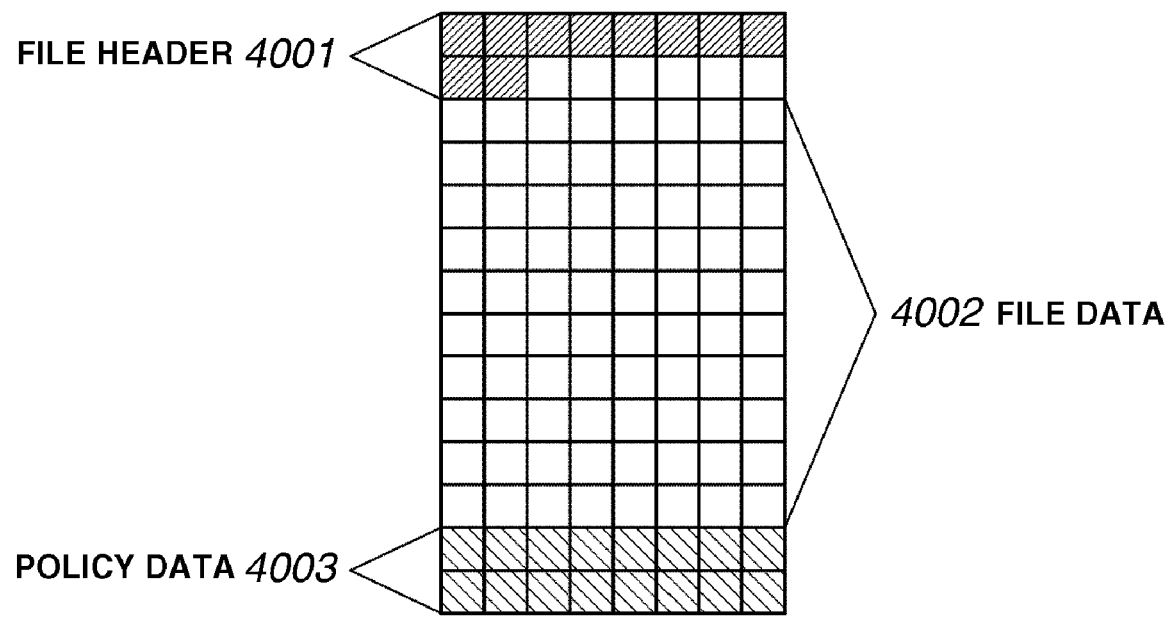
FIG. 5 illustrates a concept of an exemplary data configuration relating to a control file serving as a control data of a folder managed by the document server of FIG. 1 according to an aspect of the present invention.

FIG. 5 illustrates a concept of data configuration related to a control file serving as the control data of a folder managed at the document management server 1100 of FIG. 1, wherein a file header 4001 stores file types and metadata of the file itself.

A file data 4002 is a main content part of a file encrypted when the policy is attached. While, generic policy data 4003 includes the policy identification data required for policy confirmation in the policy management server 1200, and the document identification data for identifying documents in the policy management server 1200. Moreover, the generic policy data 4003 includes policy management server specifying data that specifies the policy management server 1200.

Figure 6:
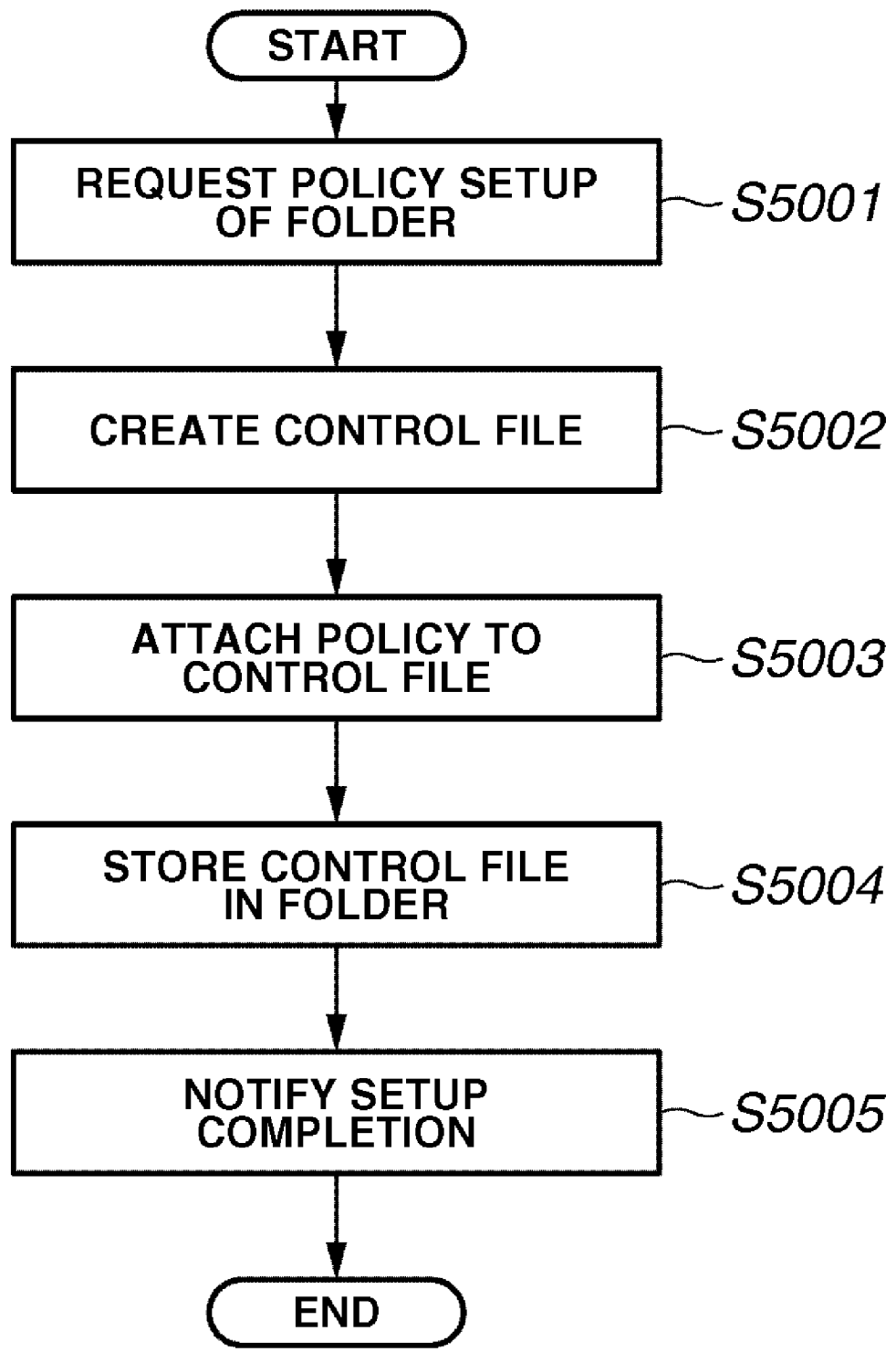
FIG. 6 illustrates a flowchart showing an example of a first data processing procedure of the information processing apparatus according to an aspect of the present invention.

FIG. 6 is a flowchart showing an example of a first data processing procedure of the information processing apparatus in accordance with the embodiments of the present invention. This process corresponds to a process for setting a policy to a folder which is managed in the document management server 1100 by the client 1000 of FIG. 1.

Each step is executed by the central processing unit (CPU) 4101 of the client 1000 of FIG. 2 which loads a control program from the hard disk unit 4106 to the memory 4104. In the present embodiment, this process is executed by the central processing unit (CPU) 4101 of the client 1000 which loads a client software to the memory 4104. Further, the client software corresponds to each module and the operating system (OS) inside the client 1000 of FIG. 1.

First, in step S5001, an operator requests setting of a policy to a folder by operating the keyboard or the pointing device. In the present embodiment, this procedure is performed through the user interface 1001 of the client 1000. For example, when a policy selection is activated on a selected folder, the policy data processing unit 1008 of the client 1000 responds to the selection, and the communication control unit 1009 issues a policy list request to the policy management server 1200.

Next, the communication control unit 1009 acquires the usable policy list managed in the policy management database (PMDS) 1205 of the policy management server 1200. Then, the policy list acquired from the policy management server 1200 is displayed on the user interface 1001, and an appropriate policy among the displayed policy list is selected by the user.

Subsequently, in step S5002, a control file is created. In the present embodiment, a file serving as a source of the control file is temporarily created on a temporary data storing area. Then, in step S5003, a policy is attached to the control file being created. This is a step of attaching the policy specified by the user in step S5001 to the file serving as the source of the control file created in step S5002.

In the present embodiment, the policy data processing unit 1008 requests policy data associating with the policy specified at step S5001 to the policy management control unit 1202 of the policy management server 1200, via the communication control unit 1009 and the communication control unit 1201.

Further, the policy management control unit 1202 of the policy management server 1200 creates the document identification data for identifying documents and a key for encrypting or decrypting the document information. The data and key are stored in the policy management database (PMDS) 1205 associating them with the specified policy. The data stored in the policy management database (PMDS) 1205 are kept and managed in a data format, for example, of the table 3002 of FIG. 4.

The created document identification data, an encryption key, and a decryption key together with the policy identification data are returned to the client 1000, via the communication control units 1201 and 1009.

In the policy data processing unit 1008 of the client 1000 according to the present embodiment, the file that is the source of the control file, is encrypted using the encryption key returned from the policy management database (PMDS) 1205. Then, as shown in FIG. 5, the document identification data and the policy identification data are added to the file data 4002.

At a head of this file, file types and positions where the document identification data and the policy identification data are written are added as the file header 4001. Thus, the policy is attached to the control file.

Subsequently, in step S5004, the control file to which the policy is attached, is stored in a targeted folder.

According to the present embodiment, in step S5003, the control file with the attached policy is transmitted to the document management server 1100 via the communication control units 1009 and 1101. Then, the control file itself is stored in the volume database 1106, and an attribute value of the control file is stored in the attribute database 107, via the document management control unit 1102 of the document management server 1100 and the database control unit 1105.

When the control file itself and the attribute value are stored in the respective databases, the document management server 1100 notifies the client 1000 by returning notification of the completion via the communication control units 1101 and 1109. In step S5005, the client 1000 side receives this notification of completion from the document management server 1100, and the process ends.

Further, the operator notifies a process result via the user interface 1001 as required. The user interface 1001 that receives this notification can control and display the process result on the liquid crystal display 4203 using a predetermined dialog.

Figure 7:
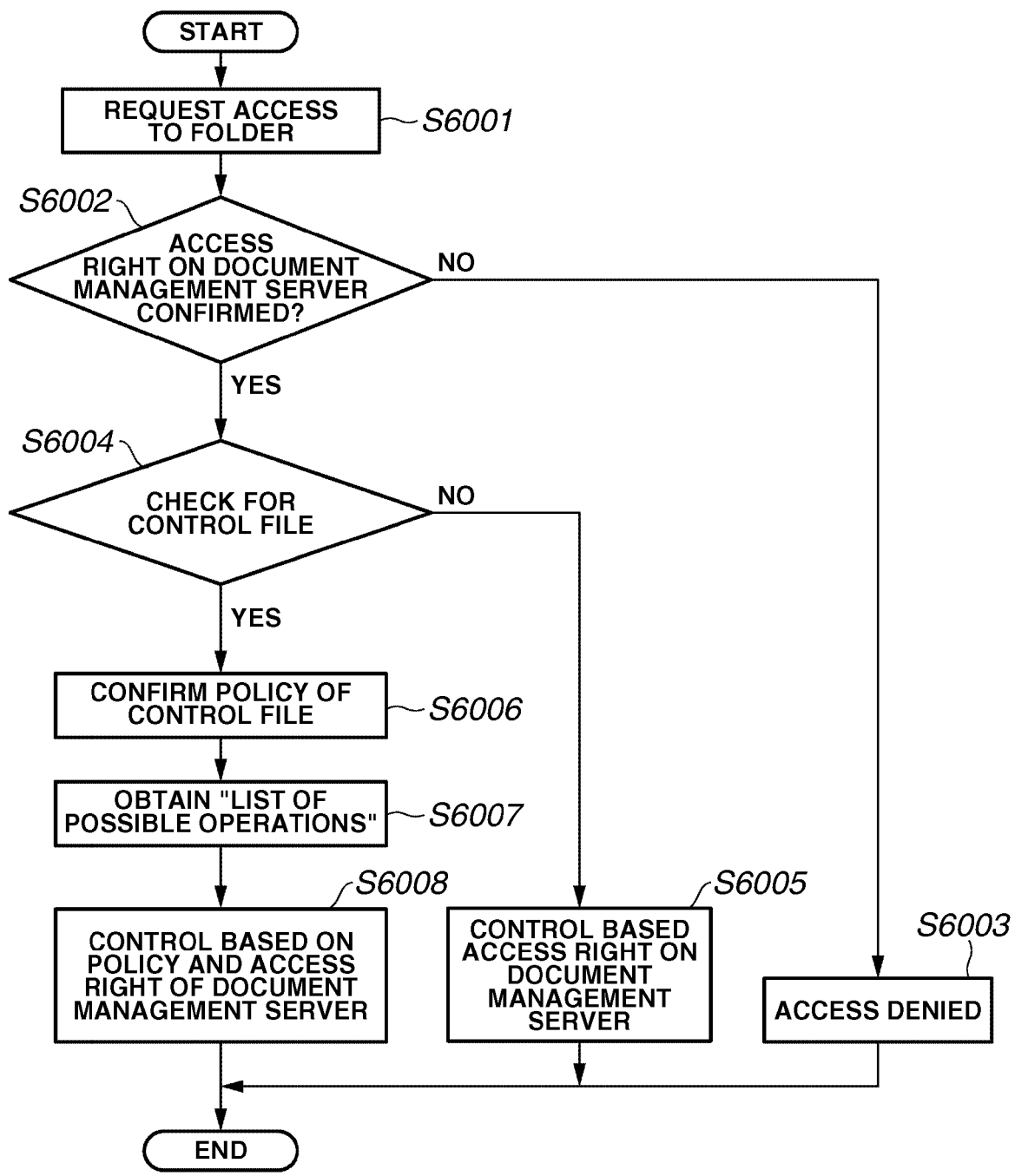
FIG. 7 illustrates a flowchart showing an example of a second data processing procedure of the information processing apparatus according to an aspect of the present invention.

FIG. 7 illustrates a flowchart showing an example of a second data processing procedure performed in the information processing apparatus in accordance with the embodiments of the present invention. This process corresponds to a process of checking the access right when a folder is accessed by the client 1000 of FIG. 1. Each step may be executed by the central processing unit (CPU) 4101 of the client 1000 of FIG. 2. The CPU 4101 loads a control program from the hard disk unit 4106 onto the memory 4104. In the present embodiment, this process is mainly executed by a client software operated on the client 1000 (the module inside the client 1000 of FIG. 1).

First, in step S6001, the operator requests access to a folder stored and managed in the document management server 1100. In the present embodiment, the user operates the keyboard and the pointing device to select the folder through the user interface 1001 of the client 1000.

Subsequently, in step S6002, an access right is confirmed in the document management server 1100. In this step, at first, an identifier and access request to the folder specified in the user interface 1001 and identification information related to the operating user, are notified to the document management server 1100 via the communication control units 1009 and 1101.

At the document management server 1100 side, the identifier and the access request of the folder which are specified by notification from the client 1000, and the identification information related to the operating user, are taken into account, and the document management control unit 1102 decides whether to permit an access.

At this time, if the document management control unit 1102 of the document management server 1100 decides that the user does not have the access right (NO in step S6002; that is, the access right is not confirmed), the process advances to step S6003, and an access denial is notified to the client 1000 through the communication control units 1101 and 1009, and the process ends.

On the other hand, in step S6002, if the access right is confirmed (YES in step S6002; that is, the document management server 1100 determines that the user can access the folder), the process advances to step S6004. Then, the document management unit 1102 checks whether a control file is placed inside a file selected by the client 1000.

As a result, if the document management control unit 1102 decides that there is no control file (NO in step S6004), the process advances to step S6005. Then, the access right information is returned to the client 1000 via the communication control units 1101 and 1009 in order to perform a control based on the access right on the document management server 1100.

On the other hand, in step S6004, if the document management server 1100 determines that a control file is notified (NO in step S6004), the process advances to step S6006 where a policy of the control file is confirmed. Here, the control file is extracted from the volume database 1106, and the control file is sent to the client 1000 via the communication control units 1101 and 1009.

More specifically, the client 1000 extracts the policy identification data attached to the control file at the policy data processing unit 1008 and the document identification data inside the policy management server 1200. Then, together with the identification information of the user who has requested access, these data are transmitted to the policy management server 1200 via the communication control units 1009 and 1201. If the policy management server 1200 authenticates the user identification information, the policy management control unit 1202 compares the information of the policy management database (PMDS) 1205 with the transmitted data. Then, according to a result of the comparison by the policy management control unit 1202, a "list of allowed operations" is created and transmitted back to the client 1000 via the communication control units 1201 and 1009.

Then, in step S6007, the policy data processing unit 1008 receives the "list of allowed operations" returned from the policy management server 1200, and notifies to the document management control unit 1006 to that effect.

Subsequently, in step S6008, according to the notified "list of allowed operations", control is performed based on the access right and policy of the document management server 1100. Its result is also reflected on the display control of the user interface 1001.

Figure 8:
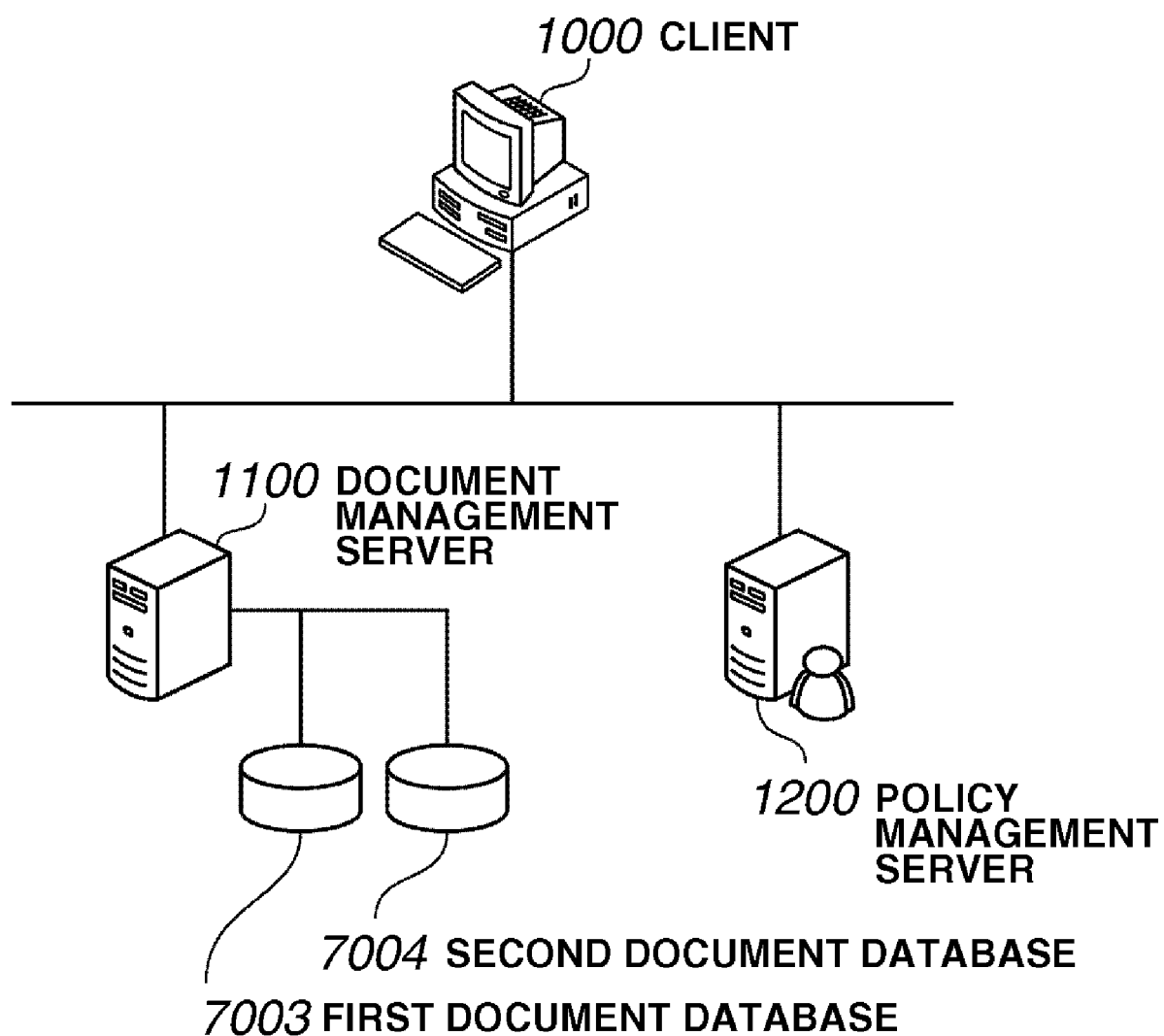
FIG. 8 illustrates an example of the document management system according to an aspect of the present invention.

FIG. 8 illustrates an example of the document management system showing the first exemplary embodiment of the present invention. The same reference numerals are given to those elements similar to FIG. 1.

Referring to FIG. 8, the client software is installed in the client 1000 that accesses the document management server 1100 and the policy management server 1200 connected to a network. The document management server 1100 includes the elements 1101 to 1105 shown in FIG. 1, and accepts access from each client 1000 on the network.

A series of first document database 7003 include the databases 1106 to 1108 inside the document management server 1100 in FIG. 1. A reference numeral 7004 denotes a second document database. Two databases including the first document database 7003 and a second document database 7004 are kept in a single document management server 1100.

The first document database 7003 and the second document database 7004 are managed by different access right systems and/or user systems (e.g. the different databases are managed by the different departments of a company). They have no information associating with each other. A policy management server software is installed inside the policy management server 1200 of FIG. 1 which receives requests from the client 1000 through the network.

In the present embodiment, the first document database 7003 and the second document database 7004 can be referred from the same client software in a shape of two directory trees. In this case, a folder or a document in one directory tree can be copied to another directory tree. For example, a folder managed in the first document database 7003 can be copied below a folder managed inside the second document database 7004. In this case, if a control file is stored in a copy source folder, this control file is also copied at the same time together with the other stored documents.

Accordingly, the access right control is executed by the same policy even if a folder is copied to a database having a different access right and user management system.

According to the present embodiment, it is possible to copy the data while keeping the same access right (the same allowed operations) as the copy source. As a specific example, a document management container such as a folder can be copied between storages of different access right and user management, for instance, between the first document database 7003 and the second document database 7004.

Second Exemplary Embodiment

The first exemplary embodiment assumes a client-server system as a model. Alternatively, the process mechanism in the client in FIG. 1 can be incorporated to a web server and accessed via a browser.

Figure 9:
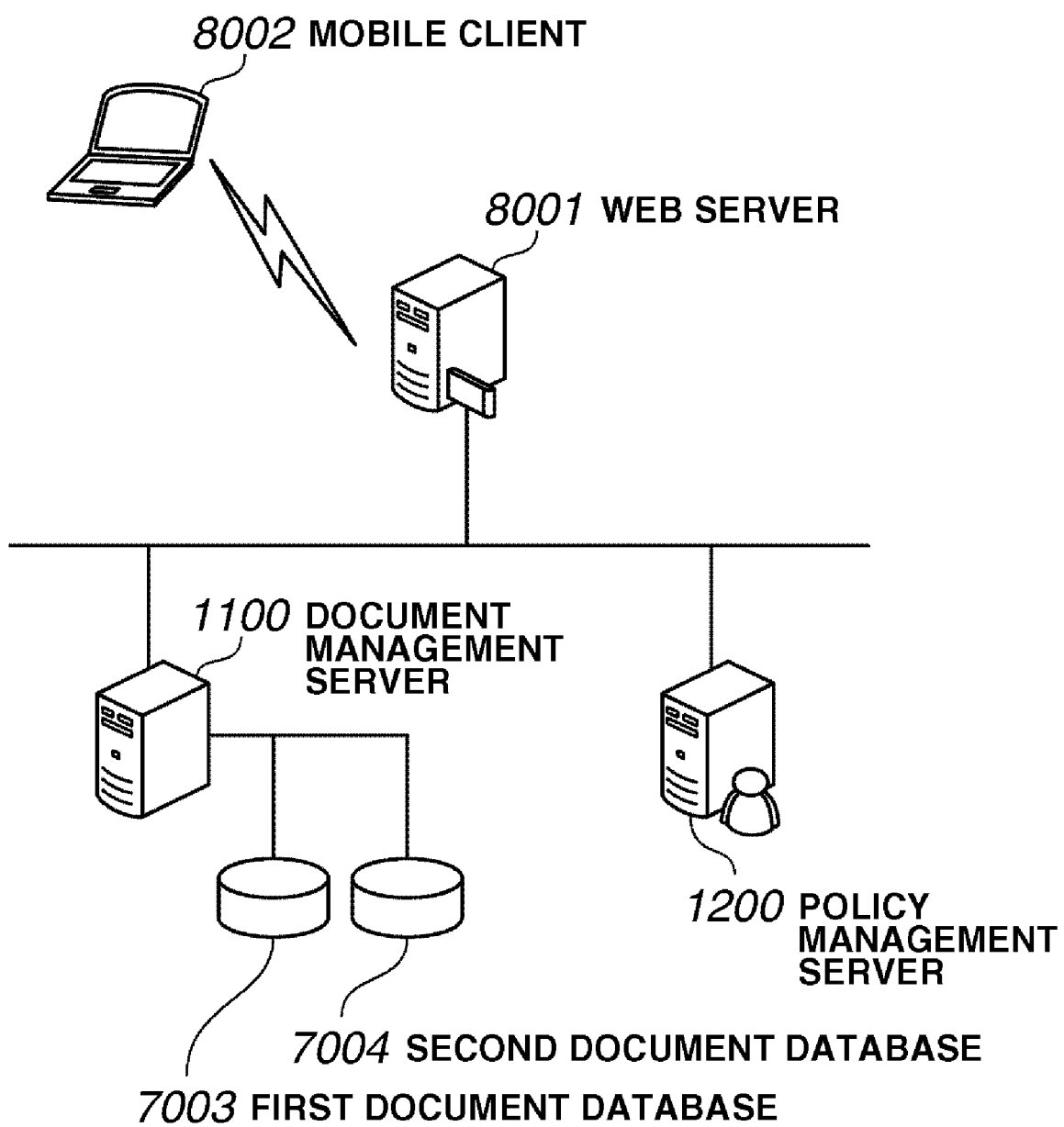
FIG. 9 illustrates an example of the document management system applicable to the server apparatus and the information processing apparatus in accordance with a second exemplary embodiment of the present invention.

FIG. 9 illustrates an example of the document processing system applicable to a server apparatus and an information processing apparatus in accordance with the second exemplary embodiment of the present invention. The same reference numerals are given to those elements similar to FIG. 1.

Referring to FIG. 9, a web server 8001 incorporates a function (function based on the software module) of the client 1000 of FIG. 1. In this case, the user interface 1001 is an interface with the web server 8001 which has a role of converting the requests received via the Intranet and Internet by the web server 8001 to commands of lower level components. Also, a mobile client 8002 accesses the web server 8001 via a web browser.

In the document management system provided with respect to the second embodiment, the document management server 1100 can therefore communicate with the web server 8001. Then, the document management server 1100 manages a plurality of folders on the first document database 7003 to store a file acquired from the web server 8001.

Moreover, the document management server 1100 acquires a control file created by the web server 8001, which controls access right of each folder. Then, the database control unit 1105 sets the control file acquired from the web server 8001 to a folder of the first document database 7003.

Further, in a case of accepting a copying request made to any of the folders, the document management server 1100 copies the folder in which the control file is set, to the second document database 7004.

There is a case where the document management server 1100 is constructed as a server apparatus communicable with the policy management server 1200 or the Web server 8001, based on a request from the mobile client 8002 serving as a client.

The document management server 1100 is provided with the first document database 7003 that secures the plurality of folders. Then, the document management server 1100 acquires the control file created at the web server 8001, and the database control unit 1105 sets it to the folder inside the first document database 7003.

According to the present embodiment, there is no need to install the client software individually to each mobile client 8002 serving as a terminal. Also, in the case where the document management container is copied between storages of different access right and user management, it is possible to copy the container while maintaining the same access right as the copy source.

Third Exemplary Embodiment

In the first exemplary embodiment, the policy data attached to the control file is transmitted to the policy management server 1200 for confirmation. Concurrently, the policy list (list of allowed operations) received from the policy management server 1200 is processed. The policy data processing unit 1008 returns the policy confirming result to the document management control unit 1102. Then, the policy data processing unit 1008 is on the client side as in FIG. 1, or on the Web server 8001 side. However, as shown in FIG. 10, the policy data processing unit can be separately provided as a policy data processing server connected by a network.

Figure 10:
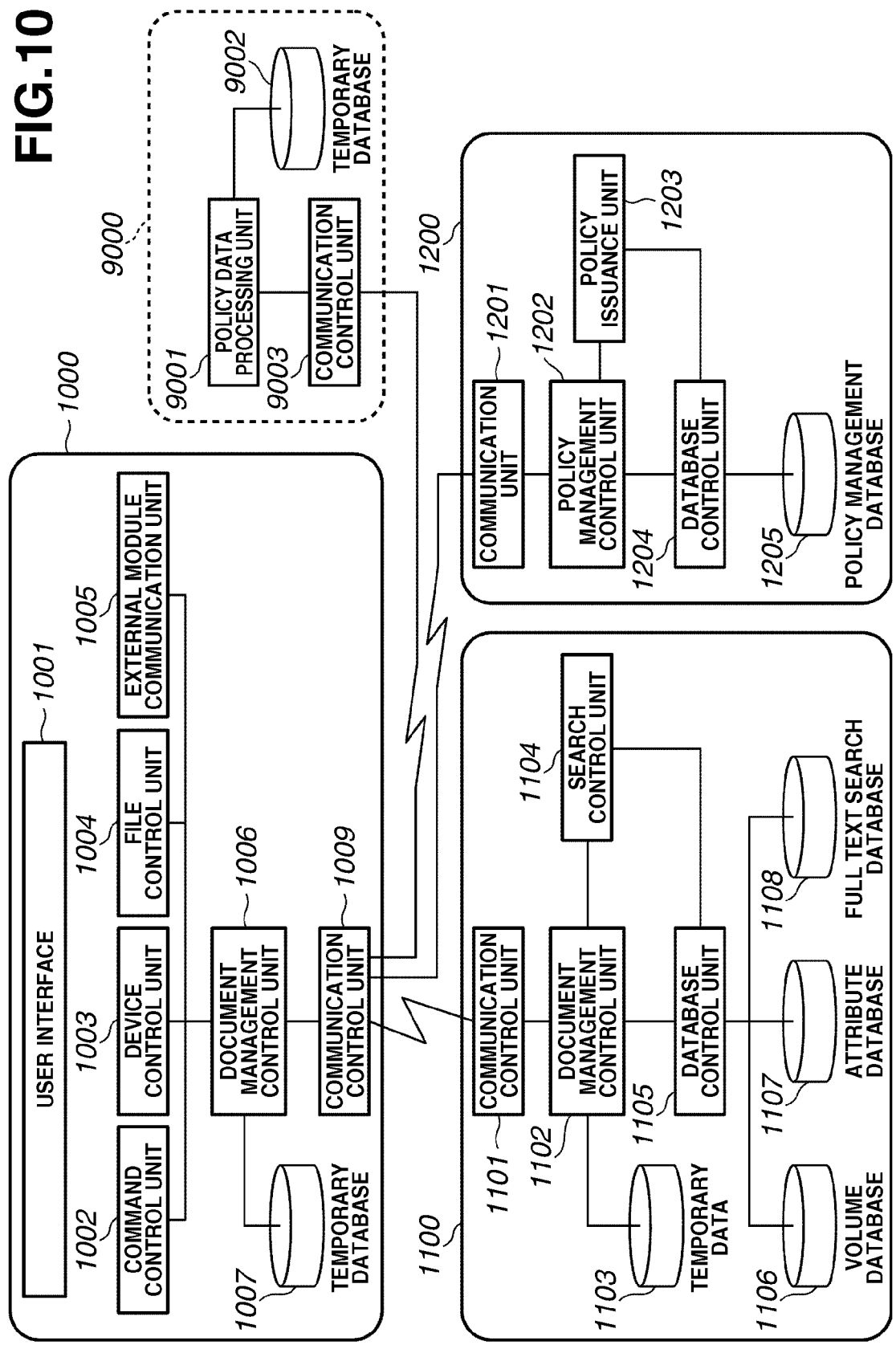
FIG. 10 illustrates an example of the document processing system applicable to a server apparatus and an information processing apparatus in accordance with a third exemplary embodiment of the present invention.

FIG. 10 illustrates an example of the document process system to which a server apparatus and an information processing apparatus according to the third exemplary embodiment of the present invention are applicable. The same reference numerals are given to elements similar to those in FIG. 1.

Referring to a policy data processing server 9000 of FIG. 10, a policy data processing unit 9001, just like the policy data processing unit 1008 of FIG. 1, transmits the policy data attached to the control file to the policy management server 1200 for confirmation. Concurrently, the policy data processing unit 9001 processes the policy list (list of allowed operations) received from the policy management server 1200 and returns the policy confirming result to the client 1000 or the web server 8001 via the communication control units 9003 and 1009. A temporary database 9002 temporarily stores temporary data. The communication control unit 9003 controls communication with the communication control unit 1009 of the client 1000.

Note that the communication control unit 1201 of the policy management server 1200 can communicate with a plurality of communication control units 1009 of many clients at the same time.

According to the present embodiment, it is possible to replace the policy management server 1200 and the policy data processing server 9000 with models of different types or other makers, by separately providing the policy data processing unit as an external server.

A module program of the policy data processing unit 9001 is normally supplied by a developer of the policy data processing server 9000, so that it cannot be voluntarily modified. However, by separating it as the other server, the operating system (OS) of a machine used as the client 1000 or the web server 8001 can be selected without any restriction from the operation environment of the policy data processing unit 9001.

Moreover, a load on the client 1000 or the Web server 8001 is reduced by preparing the policy data processing server 9000 as the separate server.

Fourth Exemplary Embodiment

In the first exemplary embodiment, the folder and directory are described which are the document management containers managed inside the document management server 1100. However, the containers of various forms can be used to transmit files, for example, a bind file that can transmit a plurality of documents as a single or plural file, an archive file that compresses a plurality of documents, and a binary (or text) file that combines a plurality of documents.

The document management control unit 1006 of FIG. 1 or FIG. 10 of the present embodiment includes a mechanism that extracts a plurality of documents from the document management server 1100, stores them in the temporary database 1007, and packages them into one file. Then, a policy attached file can also be packaged together with other files, as a control file of the packaged files.

In order to access this packaged files, the client software or the web server 8001 extracts the control file after releasing the package at the document management control unit 1006. Then, the policy data processing unit 1008 confirms its policy. The access control of these packaged files is performed based on the policy confirming result.

According to the present embodiment, in addition to the containers managed by the document management server 1100, with respect to the transmitted document management containers, a similar access control can be maintained and performed.

Fifth Exemplary Embodiment

Figure 11:
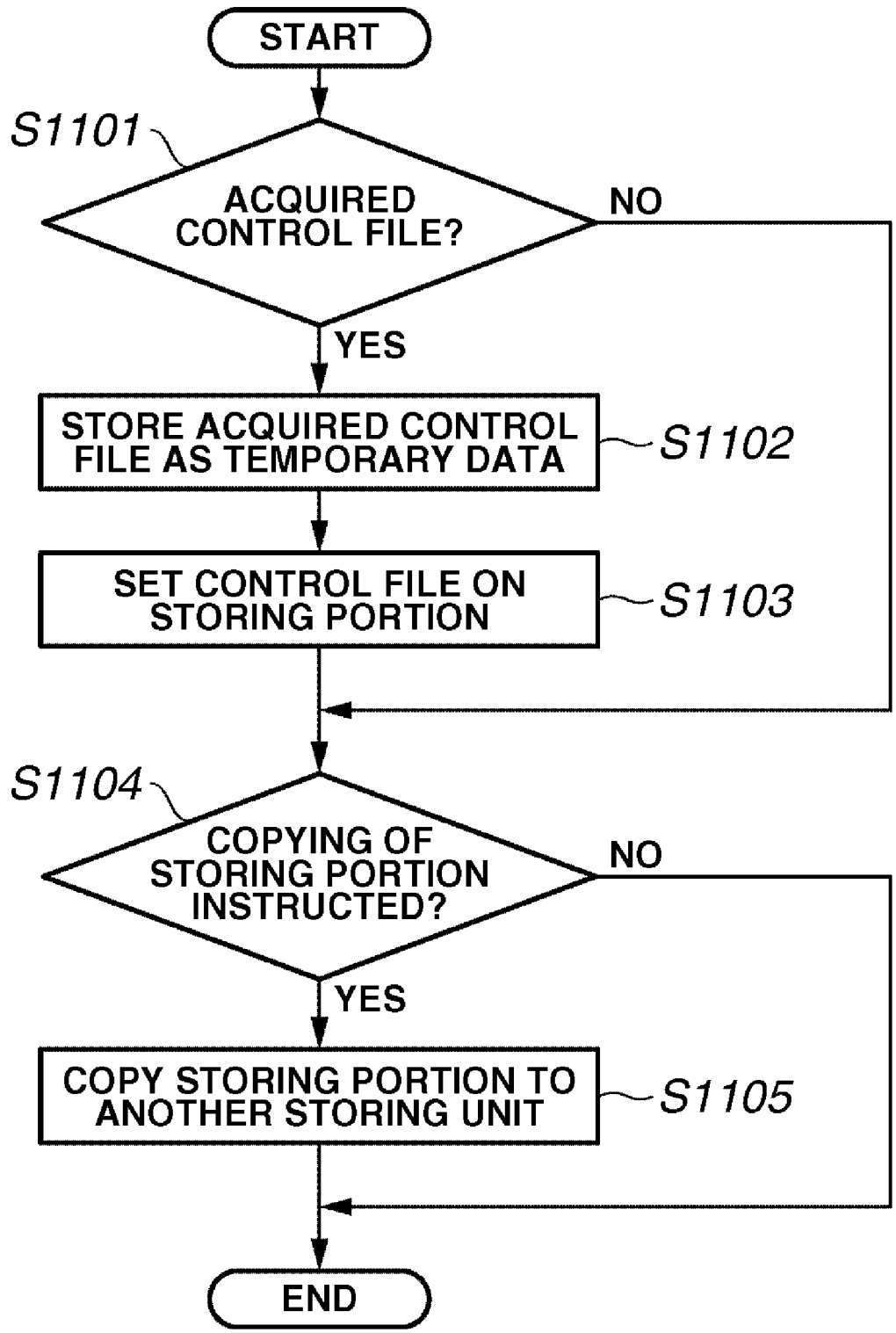
FIG. 11 illustrates a flowchart showing an example of a data processing procedure of a server apparatus in accordance with a fifth exemplary embodiment of the present invention.

FIG. 11 illustrates a flowchart showing an example of the data processing procedure of a server apparatus in accordance with the fifth exemplary embodiment of the present invention. This process corresponds to a process of setting a control file created by the client 1000 or the Web server 8001 of FIG. 9 to the first document database 7003 and 7004 of the document management server 1100. Each step is executed by the central processing unit (CPU) of the document management server 1100 by loading a control program onto a memory. In the first exemplary embodiment, the control file is created by the client 1000. In the fifth exemplary embodiment, the control file is created by the web server 8001. The example below describes the case in which the client 1000 is taken as the main creator of the control file.

At first, in step S1101, the process determines whether a control file to be set in a storing portion has been acquired from the client 1000, the storing portion (e.g. folder or directory) being in a storage of the document management server 1100.

If the process determines that the control file has not been acquired (NO in step S1101), it advances to step S1104. On the other hand, in step S1101, if the control file has been acquired (YES in step S1101), then in step S1102, the acquired control file is stored on an inner data storing portion 1103 as the temporary data.

Subsequently, in step S1103, the control file is set, which is stored in a storing portion. The storing portion is secured with a predetermined data configuration in the volume database 1106, for example. Accordingly, the control file defining the policy data can be set to the storing portion of the volume database 1106.

Subsequently, in step S1104, the process determines whether an instruction to copy any storing portion in the volume database 1106 to another storage, has been input to the client 1000 or the document management server 1100.

Here, if the process determines that no copy instruction is input (NO in step S1104), the process ends. On the other hand, if the process determines that the copy instruction is input (YES in step S1101), then in step S1105, the selected storing portion is copied according to the data configuration of another storage, and the process ends.

While the storing portion corresponds to, for example, a folder managed in a directory on the hard disk, configuration and definition of the storing portion are not influenced by the data configuration as long as the folder is manageable and confirmable by the operating system (OS).

Sixth Exemplary Embodiment

FIGS. 12 and 13 illustrate exemplary memory maps of storage medium that stores various data processing programs readable by a server apparatus and information processing apparatus according to the sixth exemplary embodiment of the present invention.

In the aforementioned memory maps, information for managing the programs stored on the storage medium, for instance, version information and creator information, can also be stored. In addition, information dependent on an operating system (OS) at a program reading side, for instance, an icon for identifying and displaying programs, can also be stored in some cases.

In addition, data belonging to various programs can be managed in a directory. Moreover, a program for installing various programs on a computer, and a program for decompressing compressed programs can also be stored in some cases.

Functions shown in FIGS. 6, 7 and 11 in the exemplary embodiments can be implemented by a host computer according to a program installed from outside. In that case, the present invention is applicable to a case where information including programs are supplied from a storage media, such as a CD-ROM, a flash memory, and an FD, or from an external storage medium through the network.

As described above, a storage medium storing program code of software that executes the functions of the above-described embodiments can be supplied to a system or an apparatus. Then, an aspect of the present invention can be achieved by reading and executing the program code stored on the storage medium by a computer (or a CPU or an MPU) of the system or apparatus.

In this case, a new function of the present invention is implemented by the program code itself read from the storage medium, and the storage medium storing the program code constitutes the present invention.

Accordingly, any form of program can be used as long as it has a program function, such as object code, a program executed by interpreter, and script data supplied to an operating system (OS).

Examples of storage medium used for supplying a program includes: a flexible disk, a hard disk, an optical disk, a magnet-optical disk, an MO, a CD-ROM, a CD-R, a CD-W, a magnetic tape, a nonvolatile memory card, a ROM, and a DVD. In this case, functions of the aforementioned embodiments are implemented by the program code itself read from the storage medium, and the storage medium storing the program code constitutes the present invention.

Besides, as a method of supplying the program, a browser of a client computer can be used to connect to a web page on the Internet. A computer program according to the present invention or a compressed file including an automatic installation function can be supplied from the web page and downloaded into a storage medium such as a hard disk. Moreover, program code that constitutes a program according to the present invention can be divided into a plurality of files, and each file can be down loaded from different web pages. In other words, a world wide web (WWW) server or a file transfer protocol (FTP) server allowing a plurality of users to download the program file for achieving the functional processes of the embodiments in a computer is included in the scope of the present invention.

Further, the program according to the present invention can be encrypted and stored on a storage medium such as a CD-ROM to be distributed to users. Then, a user who meets a predetermined condition is allowed to download key information for decryption from a web page via the Internet. The user can install and execute the encrypted program using the key information.

Moreover, a computer not only executes the program code and performs the functions of the embodiments, but also an operating system (OS) operating on the computer can perform all of or part of the actual processing based on the instruction of the program code. In that case, the functions of the embodiments are achieved by the processes described above.

In addition to that, the program code read from a storage medium is written to a memory provided in a function extension board inserted in a computer or a function extension unit connected to a computer. Then, a central processing unit (CPU) provided in the function extension board or the function extension unit performs all of or part of the actual processing based on the instruction of the program code. Thus, the functions of the embodiments are achieved by the above-described processes.

According to the embodiments of the present invention, an information processing apparatus can set the control file to a storing portion of a storage and can set access right which is different in each file by creating a control file based on the policy data issued from the outside server apparatus.

According to the embodiments of the present invention, when a file is copied between storing portions having different access right and user management, while keeping the same access right as the copy source, the file can be copied to another storage serving as a new storing portion.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-347866 filed Dec. 1, 2005, which is hereby incorporated by reference herein in its entirety.

What is claimed:

1. An information processing apparatus configured to communicate with a first server apparatus that stores and manages a document file in a container, and further configured to communicate with a second server apparatus that issues policy data for controlling operations to the container, the information processing apparatus comprising:
    a requesting unit configured to request the second server apparatus to issue policy data for the container, acquire a policy list managed by the second server apparatus, and select an appropriate policy data from the policy list based on a user instruction;
    a creating unit configured to create a control file to be stored to the container based on the appropriate policy data selected by the requesting unit, the created control file being used for acquiring from the second server apparatus a list of allowed operations which can be performed to the container;
    a transferring unit configured to transfer the created control file to the first server apparatus, wherein the transferred control file is stored with the document file in the container which is managed by the first server apparatus;
    a first acquiring unit configured to acquire, from the first server apparatus, the control file stored in an accessed container, when the information processing apparatus accesses the container which is managed by the first server apparatus;
    a second acquiring unit configured to identify the appropriate policy data based on the acquired control file, and acquire the list of allowed operations from the second server apparatus based on the identified appropriate policy data; and
    a control unit configured to control operations of the container based on the acquired list of allowed operations,
    wherein, when the container is copied, the control file is also copied at the same time together with the document file stored in the container,
    wherein the container is one of a folder or a directory.

2. The information processing apparatus according to claim 1, wherein said information processing apparatus is a client apparatus.

3. The information processing apparatus according to claim 1, wherein said information processing apparatus is a web server apparatus which is accessed by a client.

4. A server apparatus configured to communicate with an information processing apparatus, the server apparatus comprising:
    a file processing unit configured to store a document file into a container of a first storage, the document file being transferred from the information processing apparatus, wherein the information processing apparatus acquires a policy list managed by a policy management server, selects an appropriate policy data from the policy list based on a user instruction, creates a control file to be stored to the container based on the appropriate policy data, and transfers the created control file to the server apparatus, the created control file being used for acquiring from the policy management server a list of allowed operations which can be performed to the container;
    an acquiring unit configured to acquire the control file transferred from the information processing apparatus;
    a setting unit configured to store the acquired control file to the same container into which the document file is stored by the file processing unit; and
    a copying unit configured to copy the control file at the same time together with the document file stored in the container when the container is copied to a second storage based on a request to copy the container from the information processing apparatus,
    wherein the container is one of a folder or a directory,
    wherein the information processing apparatus accesses the container which is managed by the server apparatus, acquires from the server apparatus the control file stored in the accessed container, identifies the appropriate policy data based on the acquired control file, acquires the list of allowed operations from the policy management server based on the identified appropriate policy data, and controls operations of the container based on the acquired list of allowed operations.

5. The server apparatus according to claim 4, wherein said information processing apparatus is a client apparatus.

6. The server apparatus according to claim 4, wherein said information processing apparatus is a web server apparatus which is accessed by a client.

7. A file processing method carried out by an information processing apparatus configured to communicate with a first server apparatus that stores and manages a document file in a container, and further configured to communicate with a second server apparatus that issues policy data for controlling operations to the container, the method comprising:
    requesting the second server apparatus to issue the policy data for the container, acquiring a policy list managed by the second server apparatus, and selecting an appropriate policy data from the policy list based on a user instruction;
    creating a control file to be stored to the container based on the selected appropriate policy data, the created control file being used for acquiring from the second server apparatus a list of allowed operations which can be performed to the container;
    transferring the created control file to the first server apparatus, wherein the transferred control file is stored with the document file in the container which is managed by the first server apparatus;
    acquiring, from the first server apparatus, the control file stored in an accessed container when the information processing apparatus accesses the container which is managed by the first server apparatus;

identifying the appropriate policy data based on the acquired control file, and acquiring the list of allowed operations from the second server apparatus based on the identified appropriate policy data; and controlling operations of the container based on the acquired list of allowed operations, wherein, when the container is copied, the control file is also copied at the same time together with the document file stored in the container, wherein the container is one of a folder or a directory.

8. The file processing method according to claim 7, further comprising:

acquiring the control file stored in the container when the information processing apparatus accesses to the container which is managed by the first server apparatus;

identifying the policy data of the acquired control file, and acquiring from the second server apparatus a list of allowed operations which can be performed to the container; and controlling operations of the container based on the acquired list of allowed operations.

9. A file processing method for a server apparatus configured to communicate with an information processing apparatus, the method comprising:

storing a document file into a container of a first storage, wherein the information processing apparatus acquires a policy list managed by a policy management server, selects an appropriate policy data from the policy list based on a user instruction, creates a control file to be stored to the container based on the appropriate policy data, and transfers the created control file to the server apparatus, the created control file being used for acquiring from the policy management server a list of allowed operations which can be performed to the container;

acquiring the control file transferred from the information processing apparatus;

storing the acquired control file to the same container into which the document file is stored; and copying the control file at the same time together with the document file stored in the container when the container is copied to a second storage based on a request to copy from the information processing apparatus, wherein the container is one of a folder or a directory, wherein the information processing apparatus accesses the container which is managed by the server apparatus, acquires from the server apparatus the control file stored in the accessed container, identifies the appropriate policy data based on the acquired control file, acquires the list of allowed operations from the policy management server based on the identified appropriate policy data, and controls operations of the container based on the acquired list of allowed operations.

10. A computer readable storage medium readable containing computer-executable instructions for controlling an information processing apparatus configured to communicate with a first server apparatus that stores and manages a document file in a container, and further configured to communicate with a second server apparatus that issues policy data that controls operations to the container, the computer readable medium comprising:

computer-executable instructions that request the second server apparatus to issue the policy data for the container, acquire a policy list managed by the second server apparatus, and select an appropriate policy data from the policy list based on a user instruction;

computer-executable instructions that create a control file to be stored to the container based on the selected policy data, the created control file being used for acquiring from the second server apparatus a list of allowed operations which can be performed to the container;

computer-executable instructions that transfer the created control file to the first server apparatus, wherein the transferred control file is stored with the document in the container which is managed by the first server apparatus;

computer-executable instructions that acquire, from the first server apparatus, the control file stored in an accessed container when the information processing apparatus accesses the container which is managed by the first server apparatus;

computer-executable instructions that identify the appropriate policy data based on the acquired control file, and that acquire the list of allowed operations from the second server apparatus based on the identified appropriate policy data; and computer-executable instructions that control operations of the container based on the acquired list of allowed operations, wherein, when the container is copied, the control file is also copied at the same time together with the document stored in the container, wherein the container is one of a folder or a directory.

11. A computer readable storage medium readable containing computer-executable instructions for controlling a server apparatus configured to communicate with an information processing apparatus, the computer readable medium comprising:

computer-executable instructions that store a document file into a container of a first storage, wherein the information processing apparatus acquires a policy list managed by a policy management server, selects an appropriate policy data from the policy list based on a user instruction, creates a control file to be stored to the container based on the appropriate policy data, and transfers the created control file to the server apparatus, the created control file being used for acquiring from the policy management server a list of allowed operations which can be performed to the container;

computer-executable instructions that acquire the control file transferred from the information processing apparatus for controlling operations of the container;

computer-executable instructions that store the acquired control file to the same container into which the document file is stored; and computer-executable instructions that copy the control file at the same time together with the document file stored in the container when the container is copied to a second storage based on a request to copy from the information processing apparatus, wherein the container is one of a folder or a directory, wherein the information processing apparatus accesses the container which is managed by the server apparatus, acquires from the server apparatus the control file stored in the accessed container, identifies the appropriate policy data based on the acquired control file, acquires the list of allowed operations from the policy management server based on the identified appropriate policy data, and controls operations of the container based on the acquired list of allowed operations.

* * * * *